UNITED STATES PATENT OFFICE.

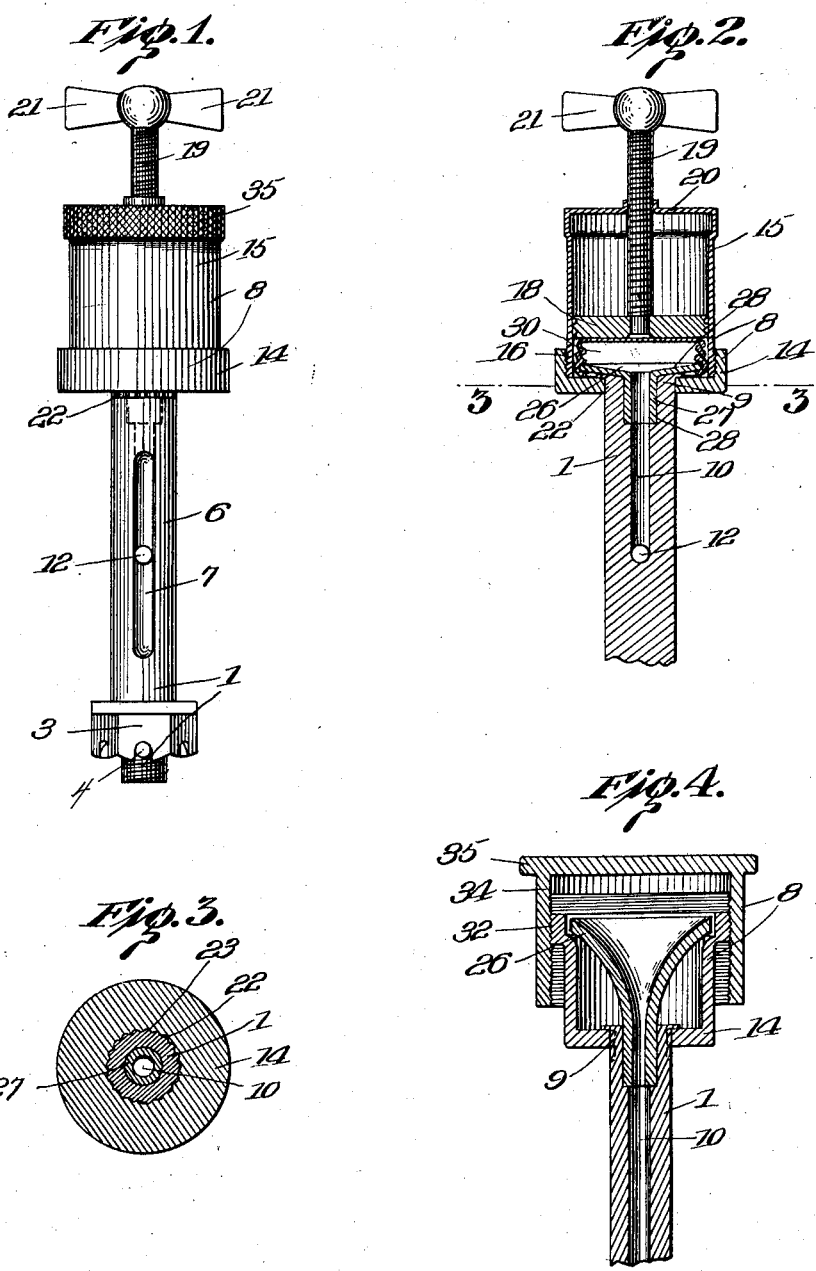

WILLIAM FREDERICK EMERSON, OF BUFFALO, NEW YORK.

LUBRICATING SHACKLE-BOLTS.

1,355,950. Specification of Letters Patent. Patented Oct. 19, 1920.

Application filed November 18, 1918. Serial No. 263,012.

*To all whom it may concern:*

Be it known that I, WILLIAM F. EMERSON, a citizen of the United States, and resident of Buffalo, in the county of Erie and State of New York, have invented certain new and useful Improvements in Lubricating Shackle-Bolts, of which the following is a specification.

This invention relates to improvements in shackle-bolts for leaf springs and means for lubricating the same and has for its object to provide a simple, inexpensive and efficient construction of combined shackle-bolt and lubricating cup adapted to facilitate the proper lubrication of the bearing portion of the bolt.

A further valuable feature of my invention consists in a particularly simple and effective means of connecting the grease cup to the shackle-bolt, designed particularly to provide a strong connection between the parts adapted to resist the rotary stresses produced in the operation of forcing the grease or lubricant into the bearing. Further features of my present invention relate to means for adapting the grease cup to employ grease charges within collapsible containers in capsule form and to facilitate the removal of the collapsed paper containers.

The various features and advantages of my invention will be understood by reference to the accompanying drawing wherein I have shown a desirable embodiment thereof and wherein the reference numerals of this description are applied to the corresponding parts in the several views.

Referring to the drawings, Figure 1 is a view in elevation illustrating my improved shackle-bolt and grease-cup construction; Fig. 2 is a central longitudinal, sectional view thereof; Fig. 3 is a view in cross-section taken on line 3—3 of Fig. 2; and Fig. 4 is a view corresponding to Fig. 2 and showing a desirable modified form.

Referring to the drawings, 1 indicates the shackle-bolt threaded on its end 2 to receive the usual retaining nut 3 locked in adjusted position by the usual lock pin 4 fitted to a hole in the bolt and entering suitable notches, as shown, in the nut.

The bolt 1, in accordance with my invention, is formed with the circular bearing portion 6 to which is fitted the bearing portion of the leaf spring and the supporting shackle member not shown. This bearing portion has the longitudinally arranged surface groove 7, designed to effect the uniform distribution of the lubricant, preferably in the form of grease which as customarily employed, is fed into the groove under pressure from a suitable grease cup 8. As shown, the grease cup 8 is affixed to the end 9 of the shackle-bolt and its interior or grease receptacle communicates with the distributing groove 7 through a central longitudinal bore 10 formed in the bolt 1 with an end opening into the grease cup, and connected with the distributing groove by a small radial bore or duct 12.

The grease cup, as shown in Figs. 1 and 2, comprises a base member 14 affixed on the end of the shackle-bolt to which the cap or cup portion 15 is detachably secured by means of the engaging threads 16 formed on the respective base and cup members. The cup is of the usual cylindrical form and has fitted to reciprocate therein a feed plunger disk 18 carried upon the inner end of a hand feed screw 19 having threaded engagement with the outer or top wall 20 of the cup member 15, and provided with hand lever flanges 21 on its external end as shown. Turning down of the feed screw will advance the plunger disk 18 and thereby force any grease or lubricant within the cup through the bores 10 and 12 into the distributing groove 7. When a new charge of grease is to be inserted, the cap member 15 is unscrewed from its threaded engagement with the base and a new charge of grease is placed within the cap with the plunger disk 15 in retracted position. Thus, the recharging of the grease cup necessitates repeated unscrewing and screwing on of the cap member which requires tightening to insure against displacement from the constant vibration to which the shackle-bolts are subjected, for instance, in connecting the springs to the frames and bodies of automobiles.

A particular feature of the present invention consists of a simple and inexpensive means for successfully attaching the base of the grease-cup to the shackle-bolt to resist the rotary stresses repeatedly imparted thereto in removing and re-attaching the cap to renew the grease charge. As will be readily understood, this action produces a severe tendency to loosen the attachment of the base to the bolt. My improved means of securely attaching these members consists in forming an annular series of serrations or tongues and grooves 22 on the outer marginal edge of the shackle-bolt by means of a suitable die, and in like manner, forming similar co-acting serrations on the inner peripheral surface or wall 23 of an aperture in the base of proper size to receive the end of the bolt which is forced therein, whereby the corrugated or serrated surfaces will co-act to resist the rotary stresses. When so assembled, the material of end of the bolt is spread or forced radially to securely clamp the base in fixed position on the bolt end.

Further features of my present invention consist in means for better adapting the grease cup for utilizing or employing charges of grease in capsule form, i. e., contained within collapsible containers of paper or other material of proper size to be received within the grease-cup. This feature of my invention consists in providing means to be engaged by the collapsed container to retain it on the fixed parts in position from which it may be conveniently removed when the cap portion 15 is detached. For this purpose, I have provided a ferrule 26 of hollow form providing a central passage therethrough for the grease and having a sleeve portion 27 of slightly tapered form adapted to be forced into securing engagement within the central bore 10 of the bolt 1. As indicated, the bore may have an enlarged outer end portion 28 to receive the sleeve. The upper or outer end of the ferrule 26 is formed as a flange 28 as shown and having its marginal portion suitably spaced from the base and wall of the cup to permit of the paper of the grease container 30 being forced thereunder when collapsed whereby the crumpled container will be retained in exposed position and withdrawn from the cap 15 when the latter is detached from the base 14.

In my improved arrangement as described, the base member 14 of the grease-cup operates as a retaining member or flange to coöperate with the retaining nut 3 in securing the shackle-bolt against longitudinal displacement.

While I have described a desirable embodiment of my invention, it will be understood that many modifications thereof may be made without departing from the scope thereof as defined in the appended claims. For instance, I have disclosed in Fig. 4 a modified form wherein in lieu of the cap 15 and plunger arrangement described, the base-member 14 is externally threaded at 32 and an internally threaded cap member 34 is threaded thereover and designed to receive the grease charge or container therein, and to expel the grease into the bearing by the action of screwing the cap 34 down onto the base 14. The cap members 15 and 34 are each formed with suitable knurled flanged portions 35 to facilitate screwing them into and out of securing engagement.

Having thus described my invention, I claim:

1. In a device of the character described, the combination of a shackle-bolt having a bearing portion and a lubricant distributing groove formed therein longitudinally of said bearing portion, a retaining nut threaded to one end of the bolt, and said bolt having its opposite marginal edge surface formed with an annular series of indentations, a grease cup base member suitably apertured to be received on the bolt end and having the wall of the aperture correspondingly formed with a series of indentations in registration with said serrated surface of the bolt, means on the bolt end to secure the base in position, a grease cup detachably connected to said base member, and said bolt being formed with a passage communicating with the interior of the grease cup and with the distributing groove and said grease cup being adapted to force the lubricant into said groove, substantially as described.

2. In a device of the character described, the combination of a shackle-bolt having a bearing portion and a lubricant distributing groove formed therein longitudinally of said bearing portion, a retaining nut threaded to one end of the bolt, and said bolt having its opposite marginal edge surface formed with an annular series of indentations, a grease cup base member suitably apertured to be received on the bolt end and having the wall of the aperture correspondingly formed with a series of indentations in registration with said serrated surface of the bolt, said bolt having the metal of its extremity expanded radially to secure said base thereon, a grease cup detachably connected to said base member and said bolt being formed with a passage communicating with the interior of the grease cup and with the distributing groove and said grease cup being adapted to force the lubricant into said groove, substantially as described.

3. In a device of the character described, the combination of a shackle-bolt having a bearing portion and a distributing groove formed thereon longitudinally of said bearing portion, a retaining nut threaded to one end of the bolt, a grease cup base member affixed to the opposite end of the bolt and adapted to co-act with the retaining nut to secure the bolt from longitudinal displacement, and a grease cup detachably connected to said base member, and said bolt being formed with a passage communicating with the interior of the grease cup and with the distributing groove, and said grease cup being adapted to force the lubricant into said groove, and means provided on the end of the bolt within the grease cup, adapted to be engaged by a collapsed container of a grease capsule, substantially as described.

4. In a device of the character described, the combination of a shackle-bolt having a bearing portion and a lubricant distributing groove formed therein longitudinally of said bearing portion, a retaining nut threaded to one end of the bolt, and said bolt having its opposite marginal edge surface formed with an annular series of indentations, a grease cup base member suitably apertured to be received on the bolt end and having the wall of the aperture correspondingly formed with a series of indentations in registration with said serrated surface of the bolt, means on the bolt end to secure the base in position, a grease cup detachably connected to said base member, and said bolt being formed with a passage communicating with the interior of the grease cup and with the distributing groove and said grease cup being adapted to force the lubricant into said groove, and means provided on the end of the bolt within the grease cup adapted to be engaged by a collapsed container of a grease capsule, substantially as described.

5. In a device of the character described, the combination of a shackle-bolt having a bearing portion and a lubricant distributing groove formed therein longitudinally of said bearing portion, a retaining nut threaded to one end of the bolt and said bolt having its opposite marginal edge surface formed with an annular series of indentations, a grease cup base member suitably apertured to be received on the bolt end and having the wall of its aperture with a complemental indented surface in engagement with said bolt marginal edge surface, said bolt having the material of its end portion radially expanded to secure said base in position on the bolt, whereby the latter co-acts with the retaining nut to secure the bolt against longitudinal displacement, a grease cup detachably connected to said base member, and said bolt being formed with a central, longitudinal bore and a radial bore connecting the grease cup with the distributing groove, substantially as described.

Signed at Buffalo, in the county of Erie, and State of New York, this 20th day of September, A. D. 1918.

WILLIAM FREDERICK EMERSON.